3,378,337
PREPARATION OF IODIC ACID AND
DERIVATIVES THEREOF
Ricardo O. Bach, Gastonia, N.C., assignor to Lithium Corporation of America, Inc., New York, N.Y., a corporation of Minnesota
No Drawing. Filed May 17, 1965, Ser. No. 456,561
12 Claims. (Cl. 23—85)

ABSTRACT OF THE DISCLOSURE

A method of preparing solutions of substantially pure iodic acid from which salts of the acid, the anhydride thereof and/or the crystalline form of the acid can be directly obtained. The method involves reacting iodine with hydrogen peroxide in the presence of a relatively minor proportion of a solution of iodic acid. The hydrogen ions and iodate ions furnished by the iodic acid in solution are believed to catalyze or favor oxidation of the iodine to its pentavalent state thereby expediting the reaction between the iodine and the hydrogen peroxide.

---

Various methods heretofore have been proposed for preparing iodic acid. One of the more generally used prior art methods of preparing the acid involves oxidizing iodine with concentrated or fuming nitric acid. Another known method involves oxidizing iodine with hydrogen peroxide in the presence of nitric acid. The first mentioned method has significant economic disadvantages both from the standpoint of the quantities of concentrated or fuming nitric acid required to carry out the reaction, and the necessity for special handling and equipment dictated by the corrosive character of the nitric acid. A further important disadvantage of this prior art method, and one which it shares with the second mentioned method, resides in the fact that the iodic acid always is obtained in solution with other acidic constituents which first must be removed before the iodic acid can be recovered. In addition, the unwanted acid constituents in the iodic acid solutions obtained in accordance with these known methods effectively prevent synthesis of salts such as iodates, for example, directly from the iodic acid solutions. It is only after the interfering acid constituents first have been purged from the iodic acid solution that such salts reasonably can be prepared from the recovered iodic acid.

In accordance with the present invention, a method has been discovered for preparing, in situ, substantially pure iodic acid solutions from which iodic acid in crystalline form, or in the form of its anhydride, can be obtained, or from which salts of iodic acid can be directly produced. The solutions are free of interfering contaminants characteristically present in iodic acid solutions obtained in accordance with heretofore used methods of preparing iodic acid. Substantially pure products can, therefore, be obtained by the method of this invention simply by employing conventional evaporation and dehydration techniques to remove the liquid phase of the solutions.

Briefly stated, the method of the present invention involves reacting iodine with hydrogen peroxide in the presence of a relatively minor proportion of a solution of iodic acid. It has been discovered that the hydrogen ions and iodate ions furnished by the iodic acid in solution catalyze or favor oxidation of the iodine to its pentavalent state thereby expediting the reaction between the iodine and the hydrogen peroxide. This result is achieved without contaminating the reaction mixture. The final solution contains substantially pure iodic acid, and can be evaporated and dehydrated to obtain the iodic acid, or the anhydride thereof, or it can be used as a medium for the direct production of salts of iodic acid.

In carrying out the method of the present invention, the iodic acid solution employed in forming the reaction mixture should contain sufficient iodic acid to provide a hydrogen ion and iodate ion concentration in the reaction mixture which will favor oxidation of iodine to its pentavalent state and impede decomposition of hydrogen peroxide. Generally speaking, the quantity of iodic acid present in the starting solution should not be below about 0.5%, with especially good results being attained with from about 1% to about 10%, usually about 5%, of the quantity of iodic acid to be produced. It is preferred to work with aqueous iodic acid solutions wherein the acid is present in a concentration, by weight, of about 5% to about 35%. Especially satisfactory results are achieved with relatively strong aqueous iodic acid solutions of concentration of about 10% to 30%, particularly from about 15% to 25%, by weight. Stated differently, the starting aqueous iodic acid solutions in the concentrations particularly preferred have a normality, or molarity, of from about 1 to about 2. In production, the desired conditions of acidity and iodate ion concentration conveniently can be established in the reaction mixture by simply using a small portion, sometimes referred to as a "heel," of the final iodic acid solution obtained in a previous run. The concentration of iodic acid in such solutions ranges from about 25% to about 35%, by weight, with densities ranging from about 1.2 to about 1.5 grams of iodic acid per milliliter of solution.

The iodine utilized in the method of this invention advantageously is in solid form. Especially satisfactory results are achieved when the iodine is finely powdered. The increased reaction surface presented by the iodine in this form renders it more readily susceptible to oxidation by the hydrogen peroxide and thus accelerates formation of the iodic acid. While the purity of the iodine used is not an overriding consideration in the preparation of iodic acid in accordance with the practice of this invention, it is of marked importance when an anhydride of iodic acid, that is, iodine pentoxide, substantially conforming to ACS specifications, is the desired end product to be obtained from the final iodic acid solution. In such event, purified iodine should be used.

The hydrogen peroxide component employed in the reaction may vary considerably in strength. Aqueous hydrogen peroxide of strength of from about 3% to about 98% can be used. However, since the strength of the aqueous hydrogen peroxide used in carrying out a method of the present invention bears a direct relationship to the volume of liquid comprising the final iodic acid solutions, and, therefore, the iodic acid concentration thereof, it is especially desirable to use aqueous hydrogen peroxide of strength of about 50% and higher, usually 60% to 90%, preferably about 70%. There is a number of aqueous solutions of hydrogen peroxide available commercially having utility for the purposes of this invention. Among these are the products sold under the trade designations "Perone" and "Becco," which products comprises aqueous hydrogen peroxide solutions of strength ranging anywhere from 25% to 98%, or higher. While standard commercial grades of aqueous hydrogen peroxide can be used to advantage in the preparation of the iodic acid solutions of this invention, in utilizing the solutions to prepare an anhydride of iodic acid which substantially conforms to ACS specifications, it is desirable to use an "uninhibited" hydrogen peroxide solution.

The proportions of the iodine and the hydrogen peroxide present in the aqueous reaction mixtures used in the practice of the method of this invention can be varied within appreciable limits. Ideally, the reaction between the iodine and the hydrogen peroxide proceeds in accordance with the following equation:

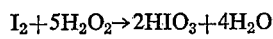

$$I_2 + 5H_2O_2 \rightarrow 2HIO_3 + 4H_2O$$

This representation of the reaction would indicate that approximately theoretical or stoichiometric proportions of the iodine and the hydrogen peroxide, that is, an iodine to hydrogen peroxide molar ratio of 1:5, can be employed. However, in practice, due to catalytic decomposition of the hydrogen peroxide component in the reaction mixture, an excess of the hydrogen peroxide is used. Accordingly, the generally optimum objectives of the invention are most advantageously attained with an iodine to hydrogen peroxide molar ratio of the order of approximately 1 of the iodine to about 10 of the hydrogen peroxide.

The temperature at which the method of the present invention is carried out may range from about 60° C. to about 80° C., more advantageously from 65° C. to 75° C., with about 70° C. being preferred. The hydrogen peroxide is especially desirably added in increments at a rate sufficient to maintain the desired temperature conditions.

In forming the reaction mixtures for preparing the substantially pure iodic acid solutions of this invention, a portion of the iodine to be used and the starting or initial iodic acid solution desirably are first mixed together. The hydrogen peroxide then is added incrementally to the mixture with constant agitation and with periodic additions of iodine. Since iodine will sublime at the temperature of the reaction mixture, the reaction advantageously is carried out in a closed vessel. Oxidation of the iodine by the hydrogen peroxide results in an easily visible change in color of the reaction mixture. This change in color serves as a convenient means for monitoring the addition of the remainder of the iodine component to the mixture. After all of the iodine has been added, and the reaction has been allowed to go to substantial completion, the reaction mixture desirably is filtered and a small amount of hydrogen peroxide is introduced into the filtrate to oxidize any remaining iodine. The final iodic acid solution may then be evaporated and dehydrated in accordance with conventional practices to obtain substantially pure iodic acid. Yields, based on iodine, of the iodic acid are 95% and higher. The iodic acid obtained can be dried under vacuum to yield iodic anhydride of a purity of better than 99%.

As indicated hereinabove, one of the significant advantages of the method of this invention is that the method enables the preparation, in situ, of substantially pure iodic acid solutions which can be used for the direct production of iodic acid salts. A wide variety of such salts, particularly iodates, can be formed from the final iodic acid solution simply by adding a suitable base to the solution. The resulting acid-base reaction produces the desired salt which then can be recovered by standard product-separation techniques. Exemplary of iodates that can be produced in accordance with this aspect of the invention are lithium iodate, ammonium iodate, barium iodate, bismuth iodate, cadmium iodate, calcium iodate, cerium iodate, cesium iodate, copper iodate, lead iodate, mercury iodate, nickel iodate, potassium iodate, sodium iodate, zinc iodate, and the like.

The following are illustrative specific examples of carrying out the present invention:

Example 1

To a solution comprising 29.4 grams of iodic acid in 250 milliliters of water, 50 grams of iodine are added. While this mixture is being stirred, 10 milliliters of 70% hydrogen peroxide are added every few minutes. The temperature of the reaction mixture rises. After the temperature reaches 65° C., further additions of the hydrogen peroxide are regulated to maintain the temperature of the reaction mixture in the range of 65°–75° C. As the solution becomes clear, more iodine is added. After a total of 800 grams of iodine have been introduced the reaction mixture is filtered, and 100 milliliters of hydrogen peroxide are added to the filtrate to bring the total amount of hydrogen peroxide used to 1735 milliliters. The final solution is clear. The solution is evaporated to dryness, yielding 1050 grams of iodic acid.

Example 2

To a solution comprising 40 grams of iodic acid in 250 milliliters of water, 100 grams of iodine are added. While the mixture is being stirred, 5 milliliters of 70% hydrogen peroxide are added. After a few minutes an additional 5 milliliters of hydrogen peroxide are added. This procedure is continued until the temperature of the reaction mixture is in the range of 65°–75° C. Iodine is added continuously to the mixture as the mixture becomes clear. When approximately 1000 grams of iodine have been added and the volume of the reaction mixture is about 2 liters, the hydrogen peroxide is added at the rate of 5 milliliters per minute until a total of 3615 milliliters have been added. Iodine is added incrementally throughout this period until a total of 2854 grams have been introduced. The reaction mixture is filtered, and 250 milliliters of hydrogen peroxide are added to the filtrate. The final solution is clear. A 100 milliliter sample of the solution is titrated with 0.12 N sodium hydroxide. Approximately 3769 grams of iodic acid are present in the solution.

Example 3

Using a vacuum oven, 300 milliliters of the final iodic acid solution of Example 2 are dried overnight at a temperature of 95°–100° C. The dried material is analyzed and found to be 99.8% iodine pentoxide.

Example 4

To 1000 milliliters of the final iodic acid solution of Example 2, 34 grams of solid lithium hydroxide are added. The solution is stirred and then evaporated to dryness under vacuum. The final product is analyzed and is found to be lithium iodate.

What is claimed is:

1. A method of preparing iodic acid comprising providing a mixture of iodine and a solution of a small proportion of iodic acid, and incrementally adding hydrogen peroxide to said mixture, the hydrogen ions and iodate ions furnished by the iodic acid in solution acting to catalyze oxidation of the iodine in the reaction mixture thereby expediting the reaction between the iodine and the hydrogen peroxide.

2. A method of preparing iodic acid comprising providing a mixture of iodine and a small amount of iodic acid, the amount of iodine present in said mixture being less than the stoichiometric amount required to produce iodic acid, and slowly adding hydrogen peroxide to the mixture while the incrementally adding the remainder of the iodine, the addition of the hydrogen peroxide being discontinued when substantially all of the iodine has been oxidized.

3. A method of preparing iodic acid comprising providing a mixture of iodine and a small amount of about a 5% to 35%, by weight, aqueous solution of iodic acid, adding hydrogen peroxide to the mixture while maintaining the temperature of the mixture in the range of from about 60° to 80° C., and recovering the iodic acid formed.

4. A method of preparing salts of iodic acid comprising forming a reaction mixture of iodine and a small amount of an aqueous solution of iodic acid, adding hydrogen peroxide to the reaction mixture, allowing the reaction to go to substantial completion, adding to the reaction mixture an acid neutralizing compound capable of reacting with the iodic acid in the reaction mixture to form a salt of the acid, and recovering the salts of iodic acid from the reaction mixture.

5. A method of preparing iodic anhydride comprising providing a mixture of iodine and a small amount of iodic acid in solution, adding hydrogen peroxide to the reaction mixture, allowing the reaction to go to substantial completion, evaporating the solution obtained, and heating the residue to produce iodic anhydride.

6. A method of preparing iodic acid comprising providing a mixture of iodine and a small amount of iodic acid in a closed vessel, slowly adding hydrogen peroxide to the mixture while agitating the mixture, filtering the resulting solution, and adding hydrogen peroxide to the filtrate to oxidize iodine present therein.

7. A method of preparing iodic acid comprising providing a mixture of iodine and a small amount of about a 5% to 35%, by weight, aqueous solution of iodic acid, and slowly adding to the mixture an aqueous hydrogen peroxide solution of strength in excess of 50% while maintaining the temperature of the mixture in the range of from about 60° to 80° C.

8. A method of preparing iodic acid comprising providing a mixture of iodine and a small amount of about a 15% to 25%, by weight, aqueous solution of iodic acid, the iodine present in said mixture being less than the stoichiometric amount required to produce iodic acid, slowly adding an aqueous solution of hydrogen peroxide of strength of about 60% to 90% while maintaining the temperature of the mixture in the range of from about 65° to 75° C., and incrementally adding the remainder of the iodine to the mixture.

9. A method as claimed in claim 8 wherein the mixture is filtered after the addition of the iodine has been completed and hydrogen peroxide is added to the filtrate to oxidize iodine present therein.

10. A method as claimed in claim 8 wherein the reaction is carried out in a closed vessel and the mixture is constantly stirred.

11. A method of preparing iodic acid comprising providing a mixture of iodine and a catalytic amount of about a 1 to 2 normal aqueous solution of iodic acid, and slowly adding an aqueous solution of hydrogen peroxide having a concentration of at least about 50% while maintaining the temperature of the mixture between about 65° C. and about 75° C., the molar ratio of iodine to hydrogen peroxide added to the mixture being about 1:10.

12. A method of preparing lithium iodate comprising providing a reaction mixture of iodine and a catalytic amount of an aqueous solution of iodic acid, slowly adding a strong aqueous solution of hydrogen peroxide to the mixture, adding lithium hydroxide to the mixture, and recovering the lithium iodate formed.

References Cited

UNITED STATES PATENTS

| 1,519,381 | 12/1924 | Lamb | 23—152 |
| 2,121,215 | 6/1938 | Weise et al. | 23—202 |

FOREIGN PATENTS 631,110  11/1961  Canada.

OTHER REFERENCES

Jacobson's "Encyclopedia of Chemical Reactions," volume 3, 1949 Edition, pages 683, 684, 713, Reinhold Pub. Corp., N.Y.

OSCAR R. VERTIZ, *Primary Examiner.*

EDWARD STERN, MILTON WEISSMAN,
*Examiners.*